Aug. 6, 1929.   J. W. SCHWAB   1,723,815

METHOD OF TREATING SULPHUR

Filed Dec. 10, 1926

James W. Schwab  INVENTOR

Pennie, Davis, Marvin and Edmonds
BY
His ATTORNEYS

Patented Aug. 6, 1929.

1,723,815

UNITED STATES PATENT OFFICE.

JAMES W. SCHWAB, OF GULF, TEXAS, ASSIGNOR TO TEXAS GULF SULPHUR COMPANY, OF BAY CITY, TEXAS, A CORPORATION OF TEXAS.

METHOD OF TREATING SULPHUR.

Application filed December 10, 1926. Serial No. 154,038.

This invention relates to the treatment of sulphur, and more particularly to the treatment of sulphur containing impurities, such as small amounts of organic impurities, the presence of which impart to the sulphur an abnormal color or other objectionable property. The invention has for its object the provision of an improved method of treating such sulphur to improve its color and/or to ameliorate its other objectionable properties.

This application is a continuation in part of my co-pending application Serial No. 689,564, for the Method of treating sulphur.

Sulphur is commonly produced or mined by underground fusion in accordance with the well-known Frasch process. In this process a fusing fluid, such as superheated water under pressure, is conveyed to the underground sulphur deposit where its heat is utilized in fusing the sulphur and the fused or melted sulphur is collected in the so-called sulphur wells and raised to the surface of the ground in a molten condition by suitable agencies, such, for example, as an air lift pump. The molten sulphur is then permitted to solidify and forms what is known in the industry as crude sulphur.

Crude sulphur as mined by the Frasch process is more nearly a pure substance than many carefully purified chemically pure chemicals. It often assays 99.95% sulphur and averages well over 99.5% sulphur. But crude sulphur always contains, in addition to minute amounts of inorganic matter, traces of impurities which affect its burning qualities and sometimes its color. These latter impurities are largely organic matter and are present in the sulphur on account of its contact with petroleum or bituminous substances which occur in the sulphur-bearing formations. The organic impurities are usually referred to as "oil".

Ordinary crude sulphur generally assays from 0.01% to 0.05% oil, but frequently contains larger amounts of oil. There does not seem to be any direct relationship between the amount of oil present in the sulphur and its color. Sulphur containing 0.02% oil may be dark brown in color, while other sulphur containing as much as 0.07% to 0.08% oil may be a bright yellow color.

Oil and sulphur react very rapidly at the temperatures prevailing at the burning point of sulphur itself and form black, asphaltic compounds which discolor the sulphur making it nearly black, and when burned an asphaltic film forms on the surface of the sulphur which ultimately extinguishes the flame. I have found that oil and sulphur react very slowly at the temperatures ordinarily prevailing in mining operations. If, however, crude sulphur is held for sometime at the temperatures prevailing in mining operations, it loses its normal bright yellow color and becomes darker yellow or brownish in color. So, in actual mining, if sulphur as it is melted in the deposit does not happen to drain readily to a producing well, it may remain in the liquid state long enough for some of the oil to react with it and cause it to lose its characteristic bright yellow color and become dark. And, should the temperature of the molten sulphur become abnormally high so that the sulphur becomes viscous, then the color of the sulphur becomes dark more rapidly. The particular shade (that is color) of the solid sulphur probably depends upon how long it had remained in the liquid state before it finally reached a producing well and was removed from the deposit and solidified, and perhaps also, to some extent, upon the temperature attained by the sulphur while molten.

While the color of crude sulphur can be fairly well controlled by careful placing of producing wells with reference to the portion of the sulphur deposit being mined, still there are often wells that produce dark or abnormally colored sulphur. In ordinary mining practice, it seems impossible not to produce some sulphur which in chemical composition and properties is practically identical with bright yellow sulphur, but which is dark or abnormal in color. The color of this dark sulphur leads those accustomed to bright sulphur to assume that it is inferior in quality, and is, therefore, a drawback to the sale of a product which is equal in quality to bright yellow sulphur.

The present invention contemplates the provision of a method of treating dark or abnormally colored sulphur to improve its color and more particularly to restore dark sulphur to its normal and characteristic bright yellow color. The invention also contemplates the provision of an improved method of removing oil and similar impurities from sulphur. In its broad aspect, the invention involves treating the sulphur in a molten condition with an adsorbent agent comprising hydrated alumino silicates of the alkali-metals and alkaline-earth metals such as typified by the materials termed zeolites, and subsequently separating the sulphur from the adsorbent material and such adsorbed or occluded impurities as have become associated therewith. Thus, the invention involves bringing dark colored sulphur in a molten or liquid condition, into intimate contact with finely divided adsorbent zeolites capable of adsorbing or occluding the dark colored impurities and to some extent a part or all of the oil. After a varying period of contact depending upon the substances used, of from a few minutes to several hours, the sulphur is separated from the adsorbtive material and its adsorbed or occluded impurities by any appropriate means. The product is sulphur of a bright yellow color which may or may not contain considerably less oil than before treatment.

Various substances are available for the practice of the invention. These may be either natural or artificial hydrate silicates of the alkali-metals or alkaline-earth metals. They may be admixed with a greater or less quantity of foreign material which has no adsorbtive property. These materials may include such substances as the natural or artificial zeolites as well as materials of the zeolite-like nature, such as the materials designated under the general heading of greensands or New Jersey greensands. I shall hereafter refer to these subtsances generically as zeolites. However, I wish it to be understood that I do not thereby intend to imply that the beneficial action of these materials is due solely to adsorbtion. On the contrary, it is my present belief that occlusion or adsorbtion may and probably does take place, although to what extent the beneficial action of these materials is due, if at all, to this or other phenomena, I am not now prepared to say.

The molten or liquid sulphur may be brought into the desired intimate contact with the zeolite adsorbent material in any convenient manner, such, for example, as by agitation with the adsorbent material or the melted sulphur may be percolated through a bed of the adsorbent zeolites.

I have found that zeolites possess to a marked extent the properties desirable for the practice of the present invention and under proper conditions these substances eliminate dark colored impurities in the sulphur as well as some of the oil. Certain of the zeolites are more effective than others. As a class the artificial zeolites have given better results than the natural product. This may be due to the more uniform nature of the artificial product or it may be due to the more finely divided condition in which the artificial product is prepared.

The amount of adsorbent zeolites required in the practice of my invention varies with the different materials and with the amount of dark colored impurities and oil to be eliminated from the sulphur. In the case of most of the artificial zeolites less than 5% by weight of the amount of sulphur treated is usually sufficient to restore the color of the sulphur nearly to the characteristic bright yellow and to remove some of the oil. In case it is desired to remove substantially all of the oil from the sulphur, additions of other adsorbent reagents which preferentially absorb the oil may be made.

The temperature at which the sulphur and the adsorbent zeolite material are brought into contact may vary within wide limits. From an operating standpoint, it is preferable to bring about this contact at temperatures ordinarily now used in handling liquid sulphur, that is, from 240° to 320° F. It is to be understood, however, that higher temperatures, or even lower temperatures, may, if desired, be employed in the practice of the present invention.

The time of contact required for improving the color of sulphur and for the removal of the impurities therefrom, varies with the particular material used, with the percentage of the material used, and with its difference, of comminution. With finely divided zeolites only a few minutes are required to get effective results. With less finely divided zeolites much longer periods of contact may be required. The time of contact required will also vary with the character of the sulphur treated and with the degree to which it is desired to carry discolorization and oil removal.

The manner in which the necessary contact between liquid sulphur and the substances used for removing the impurities is brought about may vary according to conditions. In most cases, I prefer to agitate the molten sulphur with the adsorbent material and afterwards remove the oil by any suitable means, such as by settling and decanting, filtering, centrifuging or the like.

The invention will be better understood by reference to the following accompanying drawings in which.

Figure 1:
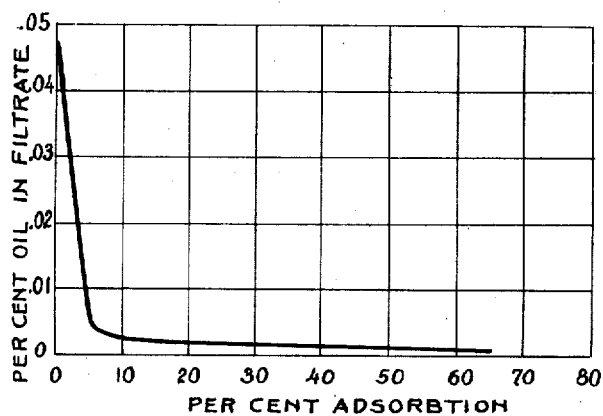
Fig. 1 represents by a graphic line the reduction in the percentage of oil in a sample of crude sulphur by the addition of varying percentages of adsorbent zeolites.
Figure 2:
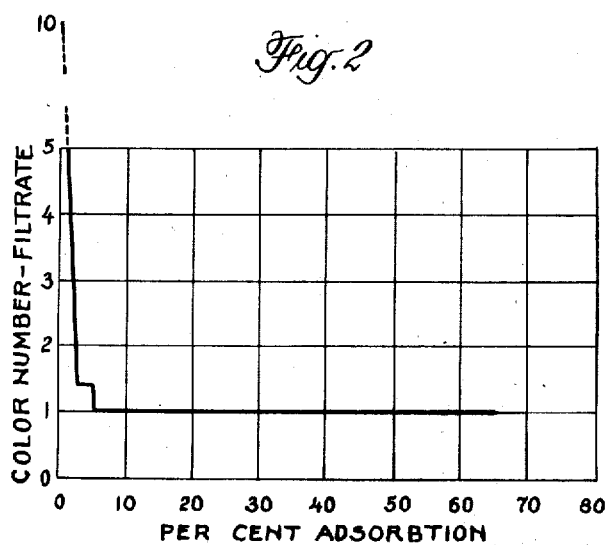
Fig. 2 represents by a graphic line the varying color of a sample of crude sulphur which has been treated with varying amounts of adsorbent zeolites.

Referring to Figs. 1 and 2 of the drawings, it will be noted that the largest effect on both the color number and the oil percentage takes place with an addition of 5% or less of the adsorbent zeolites. After the bulk of the color and oil has been removed, it is comparatively difficult to remove the last traces, even with percentages of the adsorbent zeolites running as high as 6%.

There being no standard method of determining the gradations of discolorization of sulphur, an arbitrary system has been devised and standardized. Long familiarity with these samples enables one to accurately gauge the color of the sample without even a check comparison with the standards maintained for that purpose. The standards as far as is possible to describe the color are as follows:

| Color No. | Ordinary description. |
|---|---|
| 1 | very, very bright. |
| 2 | very bright. |
| 3 | bright. |
| 4 | fairly dark. |
| 5 | dark. |
| 6 | very dark. |

From color No. 6 on to No. 10 the shades are proportionately darker.

I claim:

1. The method of improving the color of abnormally colored sulphur which comprises treating the sulphur in a molten condition with finely divided zeolites, and separating the molten sulphur from the zeolites and thereby obtaining sulphur of a color substantially approximating the characteristic normal yellow color.

2. The method of treating sulphur containing impurities, such as small amounts of organic matter, which impart to the sulphur an abnormal color, which comprises bringing the sulphur in a molten condition into intimate contact with zeolites, and separating the molten sulphur from the zeolites and thereby obtaining sulphur of a color approximating the characteristic normal yellow color.

3. The method of treating sulphur containing impurities, such as small amounts of organic matter, which impart to the sulphur an abnormal color, which comprises agitating the sulphur while molten in the presence of finely divided zeolites, and separating the molten sulphur from the zeolites and thereby obtaining sulphur of a color substantially approximating the characteristic normal yellow color.

4. The method of treating sulphur containing impurities, such as small amounts of organic matter, which impart to the sulphur an abnormal color, which comprises bringing zeolites into intimate contact with the sulphur at a temperature from about 240° F. to about 320° F., and separating the molten sulphur from the zeolites and thereby obtaining sulphur of a color substantially approximating the characteristic normal yellow color.

5. The method of improving sulphur containing contaminating impurities, which comprises bringing the sulphur in a molten condition into contact with zeolites and subsequently separating the molten sulphur from the zeolites and the impurities associated therewith.

6. The method of treating sulphur containing contaminating impurities, which comprises passing the sulphur in a molten condition through a medium containing zeolites and thereby removing a large part of the contaminating impurities from the sulphur.

In testimony whereof I affix my signature,

JAMES W. SCHWAB.

CERTIFICATE OF CORRECTION.

Patent No. 1,723,815.   Granted August 6, 1929, to

JAMES W. SCHWAB.

It is hereby certified that error appears in the printed specification of the above numbered patent requiring correction as follows: Page 3, line 6, for "6%" read "60%"; and that the said Letters Patent should be read with this correction therein that the same may conform to the record of the case in the Patent Office.

Signed and sealed this 15th day of October, A. D. 1929.

M. J. Moore,
Acting Commissioner of Patents.

(Seal)

centage takes place with an addition of 5% or less of the adsorbent zeolites. After the bulk of the color and oil has been removed, it is comparatively difficult to remove the last traces, even with percentages of the adsorbent zeolites running as high as 6%.

There being no standard method of determining the gradations of discolorization of sulphur, an arbitrary system has been devised and standardized. Long familiarity with these samples enables one to accurately gauge the color of the sample without even a check comparison with the standards maintained for that purpose. The standards as far as is possible to describe the color are as follows:

| Color No. | Ordinary description. |
|---|---|
| 1 | very, very bright. |
| 2 | very bright. |
| 3 | bright. |
| 4 | fairly dark. |
| 5 | dark. |
| 6 | very dark. |

From color No. 6 on to No. 10 the shades are proportionately darker.

I claim:

1. The method of improving the color of abnormally colored sulphur which comprises treating the sulphur in a molten condition with finely divided zeolites, and separating the molten sulphur from the zeolites and thereby obtaining sulphur of a color substantially approximating the characteristic normal yellow color.

2. The method of treating sulphur containing impurities, such as small amounts of organic matter, which impart to the sulphur an abnormal color, which comprises bringing the sulphur in a molten condition into intimate contact with zeolites, and separating the molten sulphur from the zeolites and thereby obtaining sulphur of a color approximating the characteristic normal yellow color.

3. The method of treating sulphur containing impurities, such as small amounts of organic matter, which impart to the sulphur an abnormal color, which comprises agitating the sulphur while molten in the presence of finely divided zeolites, and separating the molten sulphur from the zeolites and thereby obtaining sulphur of a color substantially approximating the characteristic normal yellow color.

4. The method of treating sulphur containing impurities, such as small amounts of organic matter, which impart to the sulphur an abnormal color, which comprises bringing zeolites into intimate contact with the sulphur at a temperature from about 240° F. to about 320° F., and separating the molten sulphur from the zeolites and thereby obtaining sulphur of a color substantially approximating the characteristic normal yellow color.

5. The method of improving sulphur containing contaminating impurities, which comprises bringing the sulphur in a molten condition into contact with zeolites and subsequently separating the molten sulphur from the zeolites and the impurities associated therewith.

6. The method of treating sulphur containing contaminating impurities, which comprises passing the sulphur in a molten condition through a medium containing zeolites and, thereby removing a large part of the contaminating impurities from the sulphur.

In testimony whereof I affix my signature,

JAMES W. SCHWAB.

---

CERTIFICATE OF CORRECTION.

Patent No. 1,723,815.  Granted August 6, 1929, to

JAMES W. SCHWAB.

It is hereby certified that error appears in the printed specification of the above numbered patent requiring correction as follows: Page 3, line 6, for "6%" read "60%"; and that the said Letters Patent should be read with this correction therein that the same may conform to the record of the case in the Patent Office.

Signed and sealed this 15th day of October, A. D. 1929.

M. J. Moore,
Acting Commissioner of Patents.

(Seal)